Dec. 23, 1924.

G. W. CRAIG

RAKE CLEANER

Filed Dec. 27, 1923

1,520,278

Inventor:
George W. Craig.
By Hazard and Miller
Attorneys.

Witness
Wm. J. Hall

Patented Dec. 23, 1924.

1,520,278

UNITED STATES PATENT OFFICE.

GEORGE W. CRAIG, OF LOS ANGELES, CALIFORNIA.

RAKE CLEANER.

Application filed December 27, 1923. Serial No. 682,860.

*To all whom it may concern:*

Be it known that I, GEORGE W. CRAIG, a citizen of the United States, residing at Los Angeles, in the county of Los Angeles and State of California, have invented new and useful Improvements in Rake Cleaners, of which the following is a specification.

This invention relates to rake cleaners and it has for its object the provision of a device which may be manufactured at a low cost, which is simple of construction and is of simple and efficient operation. Other objects of my invention will be apparent from reading the following specifications.

Although I have herein shown and described only one form of rake cleaners embodying my invention, it is to be understood that various changes and modifications may be made without departing from the spirit of the invention and of the appended claims in which the novel features of my invention will be pointed out.

In the accompanying drawings, Figure 1 is a perspective view of a rake showing my novel device attached and in which the cleaning plate is shown in raised or normal position.

Similar reference characters refer to similar parts in each of the several views.

Figure 1:
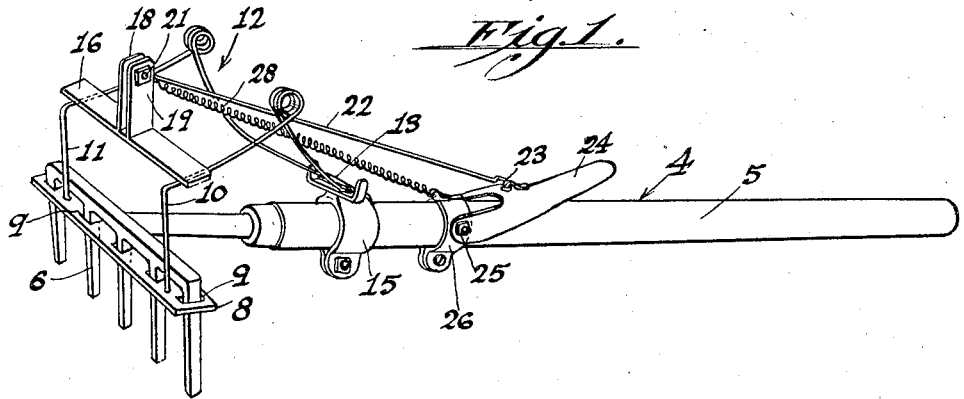

Referring more specifically to the drawings, it will be seen that a rake 4 comprises a handle 5 and prongs 6. The device here shown for cleaning the rake comprises a plate 8 having apertures 9, the number of apertures corresponding to the number of prongs of the rake, while their configuration is adapted to conform to the configuration of the prongs.

It will be noted that the plate 8 is secured to two legs 10 and 11 of a spring 12, which is secured at its back portion 13 to a clamp 15 which is attached to the handle 5 of the rake. The spring 12 is affixed to the clamp 15 in such manner that it may be rotated in vertical plane.

Affixed to the two branches of the spring 12 in such manner as to be above the plate 8 and substantially parallel therewith is a bar plate 16. In the center portion of the plate or bar 16 two uprights or standards 18 and 19 respectively are mounted. Through the upper portion of the standards 18 and 19 is positioned a pin or threaded bolt 20 secured by a nut 21. A link 22 has one of its ends rotatably mounted on the pin 20, while its other end is attached at 23 to a lever 24, which is rotatably secured at 25 to a clamp 26 affixed to the handle of the rake.

Figure 2:
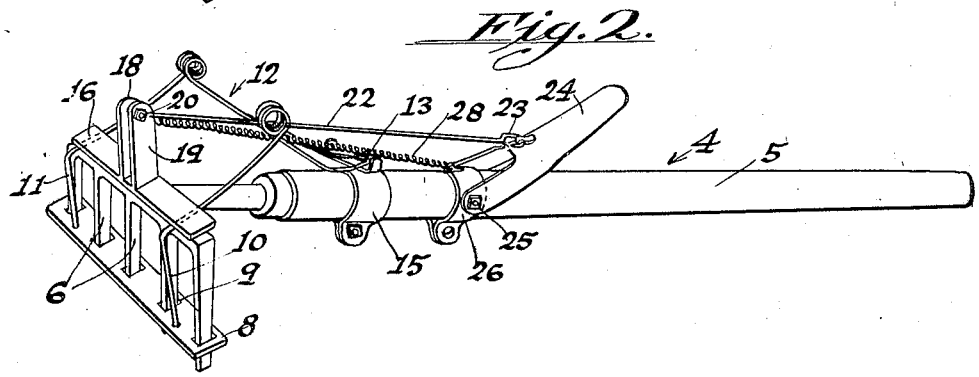
Figure 2 is also a perspective view of a rake and the cleaning device attached, showing the cleaning plate in lowered position, which it assumes after it has accomplished the cleaning action.
Figure 3:
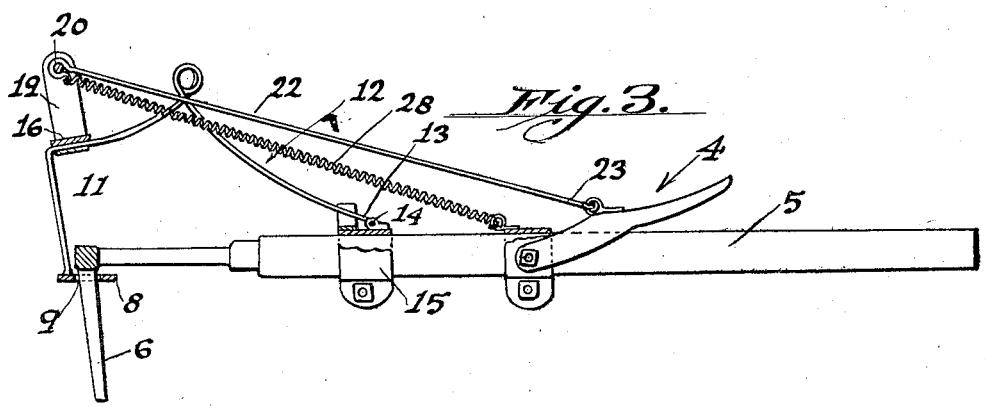
Figure 3 is a longitudinal section of a rake and of the cleaning device.

A coil spring 28 having one of its ends secured to the pin 20 and its other end secured to the clamp 26, is provided for the purpose of holding the cleaning plate 8 normally in raised position, the spring 28 being pulled to a greater tension when the plate is in a lowered position, as shown in Figure 2.

From the preceding description it will be seen that when it is desired to clean the rake this object may be accomplished by simply raising the lever 24; by thus raising the lever the link 22 is thrust forward and a downward motion is communicated to the plate 8, which slides over the prongs 6 in close contact therewith and thus cleans the rake.

When the plate 8 is in its lowered position, the spring 28 is in greatest tension and if desired the tension may be so adjusted that the cleaning plate will automatically be returned to its normal or raised position when upward pressure on the lever 24 is released.

What is claimed is:

A rake cleaner comprising a cleaning plate having apertures adapted to be passed over the prongs of a rake, a spring secured to said plate and to a rake handle, a bar affixed to said spring, uprights on said bar, a pin through said uprights, a link secured to said pin, a coiled spring attached to said pin and to a rake handle, and a lever attached to a rake handle and to an end of said link.

In testimony whereof I have signed my name to this specification.

G. W. CRAIG.